(12) United States Patent
Nakajima et al.

(10) Patent No.: US 12,271,553 B2
(45) Date of Patent: Apr. 8, 2025

(54) ELECTROSTATIC COORDINATE INPUT DEVICE

(71) Applicant: Alps Alpine Co., Ltd., Tokyo (JP)

(72) Inventors: Satoshi Nakajima, Miyagi-ken (JP); Kohei Kitagawa, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/628,907

(22) Filed: Apr. 8, 2024

(65) Prior Publication Data

US 2024/0353953 A1 Oct. 24, 2024

(30) Foreign Application Priority Data

Apr. 21, 2023 (JP) ................................. 2023-070440

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC ............................ G06F 3/04166; G06F 3/044
See application file for complete search history.

(56) References Cited

U.S. PATENT DOCUMENTS

| 6,323,846 | B1* | 11/2001 | Westerman | ........... | G06F 3/0235 345/173 |
| 2002/0015024 | A1* | 2/2002 | Westerman | ........... | G06F 3/0446 345/173 |
| 2015/0355740 | A1 | 12/2015 | Yumoto et al. | | |

* cited by examiner

*Primary Examiner* — Michael Pervan
(74) *Attorney, Agent, or Firm* — Harness, Dickey & Pierce, P.L.C.

(57) ABSTRACT

An electrostatic coordinate input device includes: a plurality of sensor electrodes disposed on the rear surface side of a manipulation surface; a measuring circuit that measures a capacitance between each of the plurality of sensor electrodes and an indicating body, with which a manipulation input is performed; and a calculating unit that calculates the coordinate of the indicating body according to a plurality of capacitances measured by the measuring circuit. The calculating unit repeatedly executes first calculation processing, in which the calculating unit measures the coordinate of the indicating body from the plurality of capacitances and then calculates an average moving speed of the indicating body according to the measured coordinate of the indicating body, as well as second calculation processing. In the second calculation processing, an average is calculated between a predicted coordinate and the measured coordinate of the indicating body, as the coordinate of the indicating body.

6 Claims, 10 Drawing Sheets

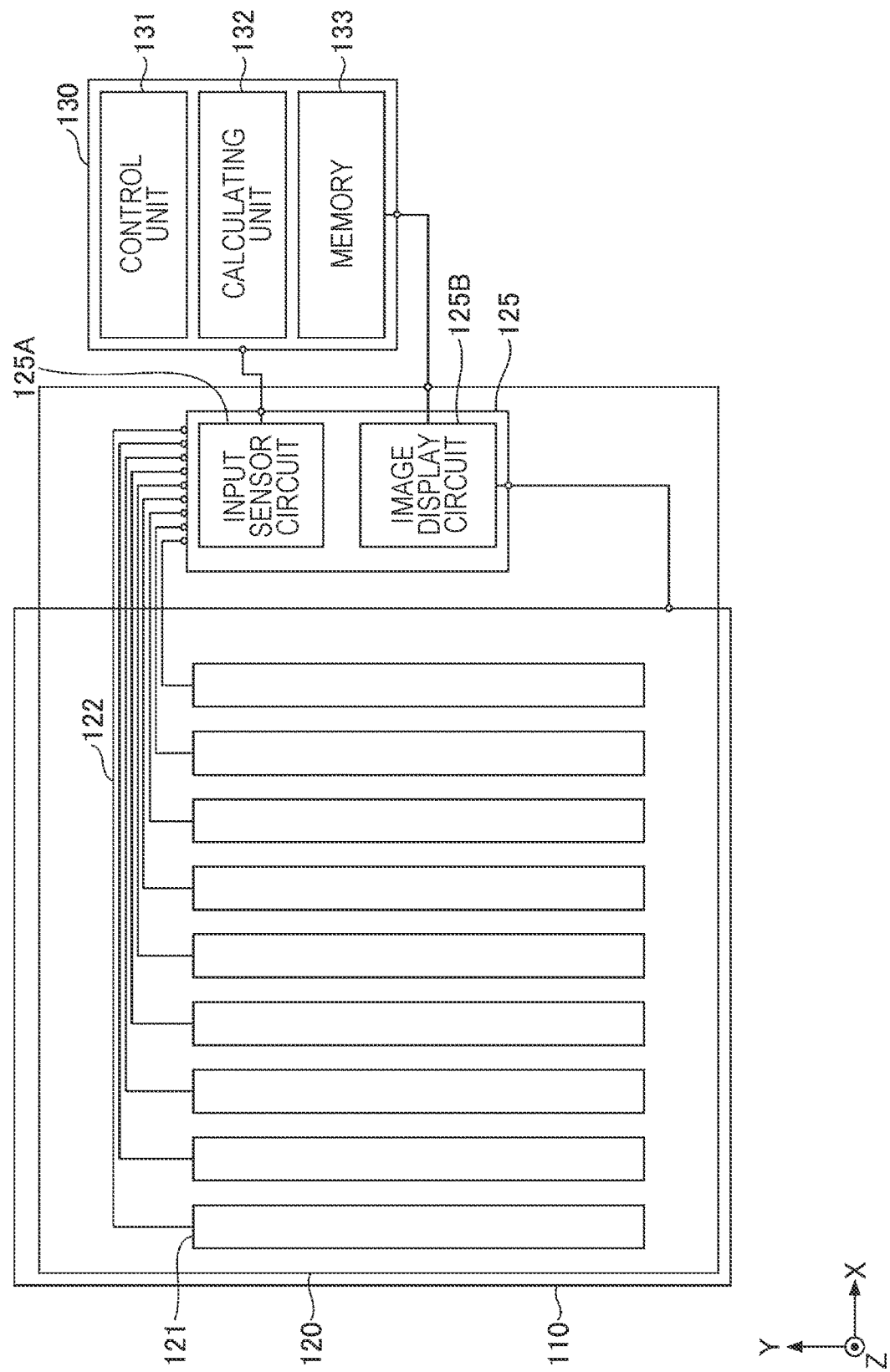

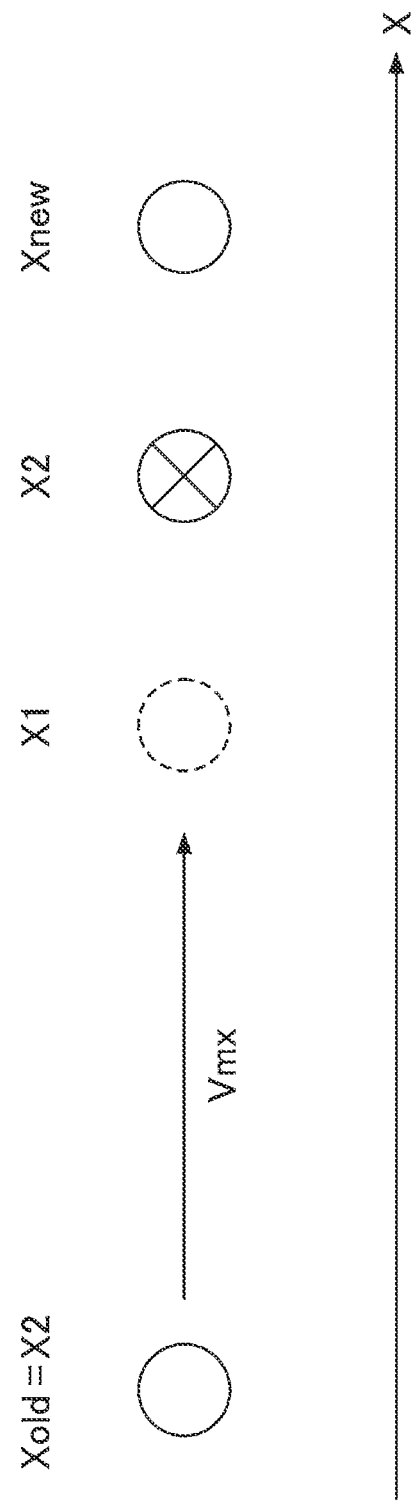

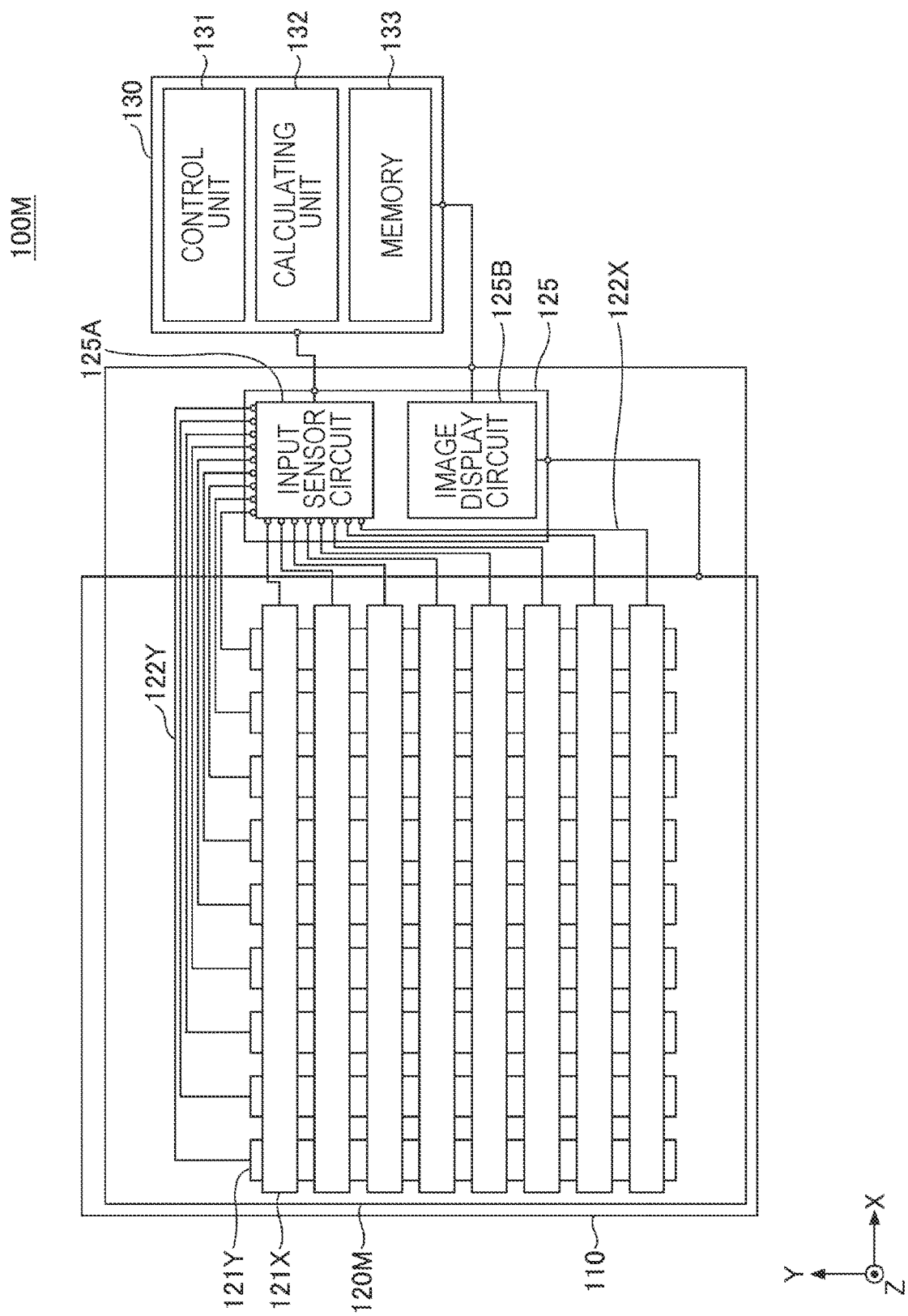

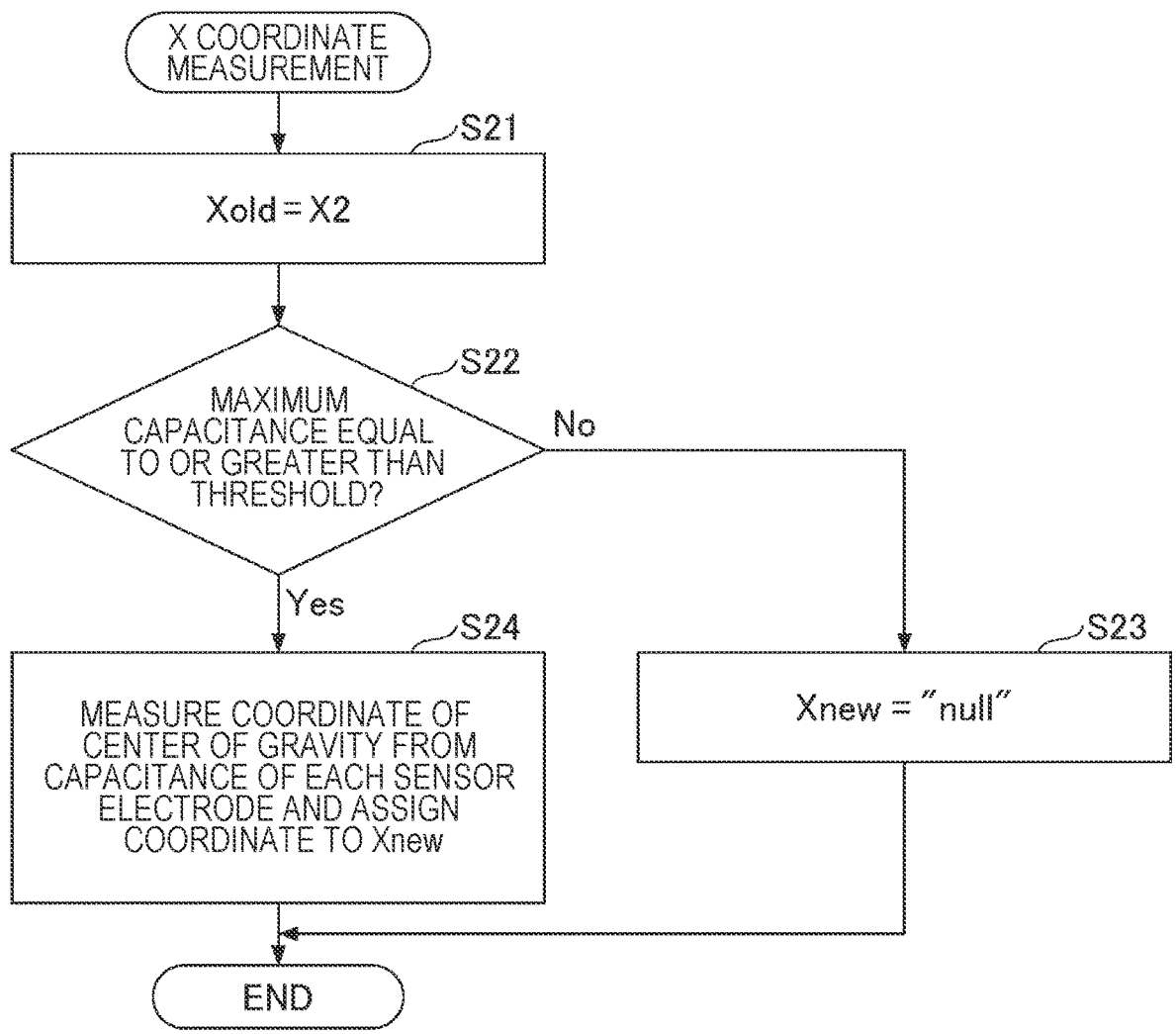

ELECTROSTATIC COORDINATE INPUT DEVICE

CROSS REFERENCE TO RELATED APPLICATION

This application claims the benefit of Japanese Patent Application No. 2023-070440 filed on Apr. 21, 2023, which is hereby incorporated by reference in its entirety.

BACKGROUND

1. Field of the Invention

The present disclosure relates to an electrostatic coordinate input device.

2. Description of the Related Art

A conventional touch panel system has a touch panel and a touch position detecting unit that detects a touch position on the touch panel. The touch position detecting unit has a touch position predicting unit that sets predicted coordinates or a predicted range for a touch position according to a touch manipulation history, after which the touch position predicting unit determines a touch position from a candidate touch position detected by the touch position detecting unit, according to the predicted coordinates or predicted range. The touch position predicting unit sets the predicted coordinates or predicted range according to the touch position, the moving speed at the touch position, and the moving acceleration at the touch position. The touch position predicting unit has a touch position determining unit that determines a touch position according to the result of a comparison between the predicted coordinates or predicted range and the candidate touch position detected by the touch position detecting unit. When a plurality of candidate touch positions are detected at a certain point in time, the touch position determining unit determines, as a touch position, a candidate touch position relatively close to the predicated coordinates or a candidate touch position in the predicated range (see US2015/0355740A1, for example).

The touch position, the moving speed at the touch position, and the moving acceleration, which are used by the conventional touch panel system to set predicted coordinates or a predicted range, are likely to be affected by noise. This may lower the precision of the predicted coordinates or predicted range.

SUMMARY

In view of this, the present disclosure provides an electrostatic coordinate input device that calculates the coordinate of an indicating body with high precision.

An electrostatic coordinate input device according to the present disclosure includes: a plurality of sensor electrodes disposed on the rear surface side of a manipulation surface; a measuring circuit that measures a capacitance between each of the plurality of sensor electrodes and an indicating body, with which a manipulation input is performed on the manipulation surface; and a calculating unit that calculates the coordinate of the indicating body according to a plurality of capacitances measured by the measuring circuit. The calculating unit repeatedly executes first calculation processing, in which the calculating unit measures the coordinate of the indicating body from the plurality of capacitances and then calculates the average moving speed of the indicating body according to the measured coordinate of the indicating body, as well as second calculation processing. In the second calculation processing, the calculating unit calculates the average between a predicted coordinate and the measured coordinate of the indicating body as the coordinate of the indicating body, the predicted coordinate being obtained by adding a product, which is obtained by multiplying the average moving speed by time from the last first calculation processing to the current first calculation processing, to the coordinate, calculated in the last second calculation processing, of the indicating body. It is possible to provide an electrostatic coordinate input device that calculates the coordinate of an indicating body with high precision.

BRIEF DESCRIPTION OF THE DRAWINGS

FIG. 2 illustrates an example of the structures of a capacitive sensor, a control device, and the like included in the electrostatic coordinate input device in the embodiment;

FIG. 3 illustrates an example of a process in which the electrostatic coordinate input device in the embodiment calculates the X coordinate of a fingertip;

FIG. 5 illustrates an example of the structures of a capacitive sensor, a control device, and the like included in an electrostatic coordinate input device in a variation of the embodiment;

FIG. 6B is a flowchart illustrating an example of processing executed by the calculating unit in the electrostatic coordinate input device in the variation of the embodiment;

DESCRIPTION OF THE PREFERRED EMBODIMENTS

An embodiment to which an electrostatic coordinate input device of the present disclosure is applied will be described below.

Embodiment

Figure 1:
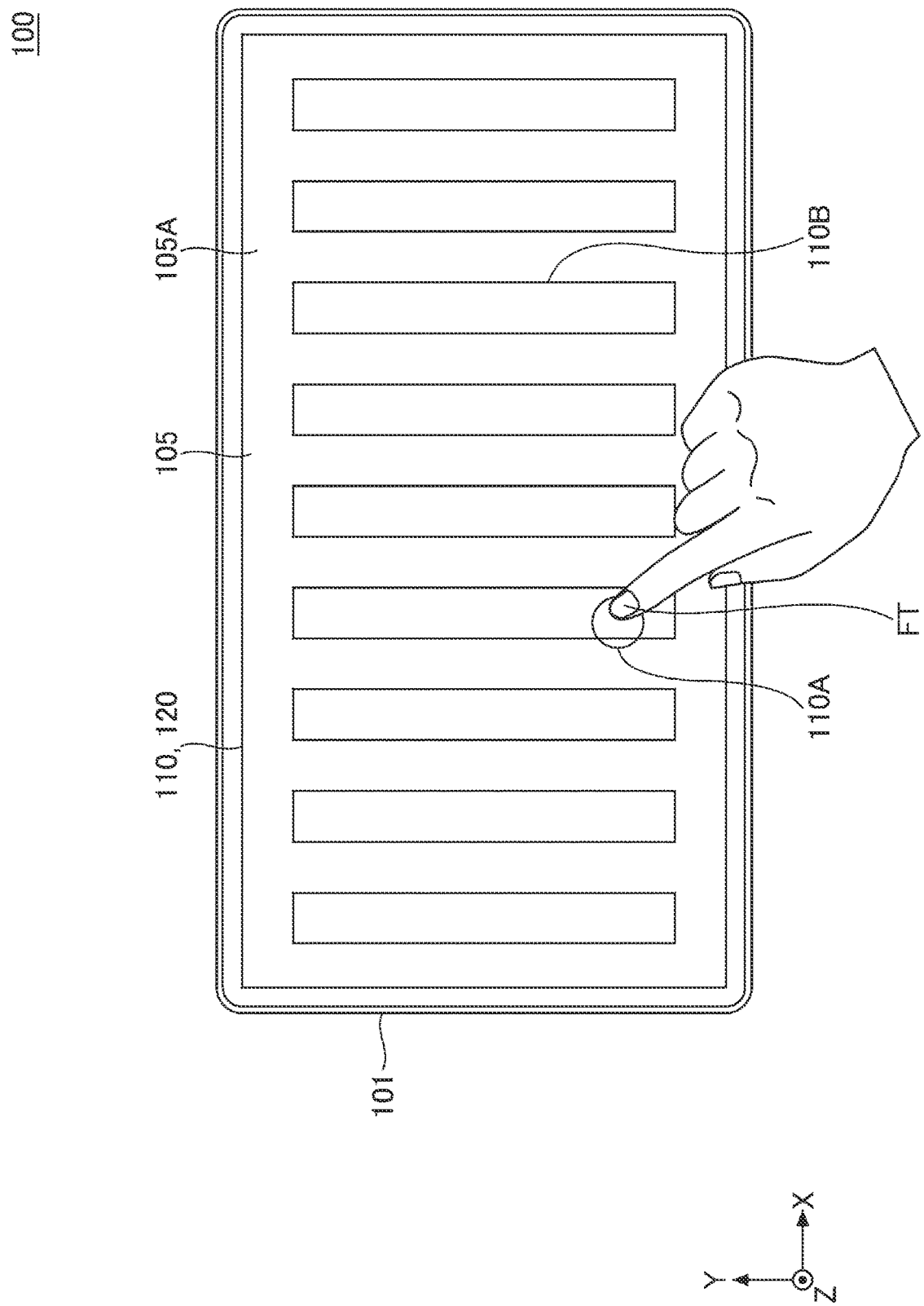
FIG. 1 illustrates an example of the structure of an electrostatic coordinate input device in an embodiment.

FIG. 1 illustrates an example of the structure of an electrostatic coordinate input device 100 in this embodiment. In FIG. 1, the electrostatic coordinate input device 100 is in operation and a display 110 displays an input image. FIG. 1 also illustrates a fingertip FT, of the user, with which a manipulation input is performed on the electrostatic coordinate input device 100. The fingertip FT is an example of an indicating body.

FIG. 2 illustrates an example of the structures of a capacitive sensor 120, a control device 130, and the like included in the electrostatic coordinate input device 100.

The description below is based on an XYZ coordinate system. The X axis is an example of a first axis. The Y axis is an example of a second axis. The Z axis is an example of a third axis. A direction parallel to the X axis is the X direction. A direction parallel to the Y axis is the Y direction. A direction parallel to the Z axis is the Z direction. These directions are mutually orthogonal. In the description below, the −Z direction will refer to a direction toward the capacitive sensor 120 and the +Z direction will refer to a direction away from the capacitive sensor 120; the phrase "in plan view" will refer to an XY plane being viewed; and for easy understanding of the structure, the length, bulkiness, thickness, and the like of each portion may be indicated by being exaggerated.

The electrostatic coordinate input device 100 may be, for example, an input device in a center console in a vehicle. Alternatively, the electrostatic coordinate input device 100 may be a tablet computer, a smartphone, a game machine, or the like.

Entire Structure of the Electrostatic Coordinate Input Device 100

The electrostatic coordinate input device 100 includes a cabinet 101, a top panel 105, a display 110, a capacitive sensor 120, a wiring board 125, an input sensor circuit 125A, an image display circuit 125B, and the control device 130. The input sensor circuit 125A is an example of a measuring circuit. Although the control device 130 (see FIG. 2) is not illustrated in FIG. 1, it is disposed below the display 110 and capacitive sensor 120 in the cabinet 101, as an example. The capacitive sensor 120 and control device 130 included in the electrostatic coordinate input device 100 are as illustrated in FIG. 2.

Cabinet 101 and Top Panel 105

The cabinet 101 is a case made of a resin, a metal or the like. The cabinet 101 accommodates the display 110, capacitive sensor 120, and control device 130. The display 110 is disposed below the capacitive sensor 120, which is transparent, as an example. The display 110 is visible through a manipulation surface 105A, which is the upper surface of the top panel 105, which is transparent, the top panel 105 being disposed in an opening formed in the upper portion of the cabinet 101.

The electrostatic coordinate input device 100 can be manipulated both in a state in which the indicating body, which is, for example, the fingertip FT or hand of the user, is in contact with the manipulation surface 105A and in a state in which the indicating body, which is, for example, the fingertip FT or hand of the user, is not in contact with the manipulation surface 105A. Here, a case in which a manipulation is performed in the contact state will be described. However, the description below is also true when a manipulation is performed in the non-contact state. Although the electrostatic coordinate input device 100 can also be manipulated with other than the fingertip FT, a case in which the electrostatic coordinate input device 100 is manipulated with the fingertip FT will be described below.

The electrostatic coordinate input device 100 is manipulated when the user performs a pointing manipulation. The pointing manipulation is performed by stretching the fingertip FT substantially perpendicularly to the manipulation surface 105A. Although a plurality of fingers may be used in a pointing manipulation, a single finger is preferably used.

The electrostatic coordinate input device 100 uses a differential value ΔAD as a capacitance between the fingertip FT and the capacitive sensor 120. The differential ΔAD is a count value equivalent to the amount of change from a reference value of an output (capacitance) from the input sensor circuit 125A.

Display 110

The display 110 is a liquid crystal display, an organic electroluminescence (EL) display, or the like, as an example. The display 110 provides a display to achieve a graphic user interface (GUI).

In FIG. 1, a pointer 110A and slide switches 110B are illustrated as an example. The display 110 displays images of the pointer 110A and slide switches 110B as an example. The pointer 110A and slide switches 110B are GUI parts displayed as the GUI. The pointer 110A and slide switches 110B are examples of GUI manipulation portions. The slide switches 110B are arranged along the X direction. When the fingertip FT is moved in the Y direction along the slide switch 110B, a slide manipulation is achieved.

Although an aspect in which the electrostatic coordinate input device 100 includes the display 110 will be described here as an example, the electrostatic coordinate input device 100 may lack the display 110. In this case, it is only necessary to, for example, provide a frame by using a print pattern or the like similar to the slide switches 110B on the manipulation surface 105A of the top panel 105 or on a surface, opposite to the manipulation surface 105A, of the top panel 105. When a frame is provided on the surface, opposite to the manipulation surface 105A, of the top panel 105 by using a print pattern or the like, the top panel 105 only needs to be transparent.

Capacitive Sensor 120, Wiring Board 125, Input Sensor Circuit 125A, and Image Display Circuit 125B The capacitive sensor 120 is overlaid on the display 110. The capacitive sensor 120 has a plurality of sensor electrodes 121 as illustrated in FIG. 2. Although nine sensor electrodes 121 are illustrated in FIG. 2 as an example, any number of sensor electrodes 121 may be used if the number is more than 1.

Each sensor electrode 121 is a stripe electrode extending in the Y direction. The plurality of sensor electrodes 121 are arranged in the X direction. The sensor electrodes 121 are disposed on the rear surface side (−Z-direction side) of the manipulation surface 105A. The wiring board 125, on which the input sensor circuit 125A and image display circuit 125B are mounted, is placed next to the capacitive sensor 120 and display 110. The input sensor circuit 125A is connected between wires 122 and the control device 130. The image display circuit 125B is connected between the display 110 and the control device 130. When the display 110 is not included, the image display circuit 125B is unnecessary.

Each sensor electrode 121 is connected to the control device 130 through the wire 122 and input sensor circuit 125A. The capacitive sensor 120 of this type can be manufactured by, as an example, forming a transparent conductive film such as an indium-tin-oxide (ITO) transparent conductive film on a surface of a transparent glass and then performing pattering on the transparent conductive film to form sensor electrodes 121 and wires 122. The value of a capacitance detected by the capacitive sensor 120 is entered into the control device 130.

FIG. 2 illustrates a plurality of sensor electrodes 121 as an example.

The wiring board 125 is included in the capacitive sensor 120. The wiring board 125 is of a flexible type or a rigid type. The input sensor circuit 125A is disposed between the wires 122 and the control device 130. The input sensor circuit 125A sequentially selects a plurality of wires 122 one at a time, obtains a capacitance of the capacitive sensor 120, converts the obtained capacitance from analog to digital, and outputs the conversion result to the control device 130. The image display circuit 125B is disposed between the display 110 and the control device 130. The image display circuit 125B displays an image on the display 110 according to image data sent from the control device 130.

Control Device 130

The control device 130 has a control unit 131, a calculating unit 132, and a memory 133. The control device 130 is implemented by a computer that includes a central processing unit (CPU), a random-access memory (RAM), a read-only memory (ROM), an input/output interface, an internal bus, and the like. The control unit 131 and calculating unit 132 are functions, represented as functional blocks, of programs executed by the control device 130. The memory 133 is a functional representation of a memory in the control device 130.

The control unit 131 comprehensively controls the operation of the electrostatic coordinate input device 100. The control unit 131 performs control to display an image on the display 110 through the image display circuit 125B, according to the coordinates of the fingertip FT, the coordinates being calculated by the calculating unit 132. In addition, the control unit 131 outputs a command in correspondence to a manipulation performed by the fingertip FT, and performs other processing. In an example in which the control unit 131 outputs a command in correspondence to a manipulation, when the electrostatic coordinate input device 100 is used to make a manipulation input to adjust the air flow rate of an air conditioner in a vehicle, the control unit 131 outputs a command to a control device in the air conditioner, the command representing an air flow rate matching the position of the slide switch 110B corresponding to the coordinates of the fingertip FT.

The calculating unit 132 performs processing to calculate the XY coordinates of the fingertip FT, the XY coordinates being based on a capacitance (represented by a digital value) entered from the input sensor circuit 125A. Specifically, the calculating unit 132 converts the capacitance (represented by a digital value) entered from the input sensor circuit 125A to the differential value $\Delta AD$, and calculates the coordinates of the fingertip FT according to the differential value $\Delta AD$. Since here the manipulation portion (GUI manipulation portion) of the electrostatic coordinate input device 100 is composed of the pointer 110A and the slide switches 110B arranged along in the X direction, as an example, the calculating unit 132 calculates the X coordinate of the fingertip FT.

The memory 133 stores programs to be executed by the control unit 131 to execute control processing and programs to be executed by the calculating unit 132 to execute calculation processing, and also stores data and the like generated during the execution of control processing and calculation processing.

Calculation Processing Executed by the Calculating Unit 132

A capacitance (represented by a digital value) entered from the input sensor circuit 125A is affected by noise. Therefore, if the X coordinate of the fingertip FT is calculated according to only the capacitance measured by the input sensor circuit 125A at a certain moment, a deviation may occur in the X coordinate due to the effect of noise. If the X coordinate suffers from this type of effect of noise, precision with which the X coordinates is calculated is lowered.

In view of this, the calculating unit 132 repeatedly executes calculation processing including first calculation processing and second calculation processing, which will be described below, so that the X coordinates of the fingertip FT can be calculated with high precision.

In the first processing, the calculating unit 132 calculates the average moving speed Vmx of the fingertip FT. The value of the average moving speed Vmx of the fingertip FT is the average Vmx of the moving speed Vx of the fingertip FT.

In the second calculation processing, the calculating unit 132 calculates a coordinate X2 of the fingertip FT from the average moving speed Vmx calculated in the first calculation processing.

An aspect will be described below as an example in which the calculating unit 132 repeatedly executes the first calculation processing and second calculation processing once per control period T. In each control period T, the calculating unit 132 executes the first calculation processing once and also executes the second calculation processing once. The control period T is an example of time t from when the first calculation processing is executed in the control period T one period before the current control period T to when the first calculation processing is executed in the current control period T. That is, time t is held to fixed time, which is the control period T.

In the execution of the first calculation processing and second calculation processing by the calculating unit 132 in each control period T, the first calculation processing in the current control period T will be referred to as the current first calculation processing. The current first calculation processing is the latest first calculation processing.

The first calculation processing in the control period T one period before the current control period T will be referred to as the last first calculation processing. The first calculation processing in the control period T two periods before the current period T will be referred to as the first calculation processing before last.

Similarly, in the execution of the first calculation processing and second calculation processing by the calculating unit 132 in each control period T, the second calculation processing in the current control period T will be referred to as the current second calculation processing. The current second calculation processing is the latest second calculation processing.

The second calculation processing in the control period T one period before the current control period T will be referred to as the last second calculation processing. The second calculation processing in the control period T two periods before the current period T will be referred to as the second calculation processing before last.

A value calculated (or measured) in the current first calculation processing or current second calculation processing may be referred to as the current calculated value (or measured value). A value calculated (or measured) in the last first calculation processing or last second calculation processing may be referred to as the last calculated value (or measured value). A value calculated (or measured) in the first calculation processing before last or the second calculation processing before last may be referred to as the calculated value (or measured value) before last.

As described above, an aspect will be described below as an example in which the calculating unit 132 repeatedly executes the first calculation processing and second calculation processing once per control period T. However, the calculating unit 132 may repeatedly execute the first calculation processing and second calculation processing without setting time t from the last first calculation processing to the current first calculation processing to fixed time.

For example, time t may be measured each time from when the first calculation processing is executed in the control period T one cycle before the current control period T to when the first calculation processing is executed in the current control period T, and the average moving speed Vmx and a predicted coordinate X1 may be calculated as will be described later.

First Calculation Processing and Second Calculation Processing

The first calculation processing and second calculation processing are repeatedly executed. In the first calculation processing, a value calculated in the last second calculation processing is used. Similarly, in the second calculation processing, a value calculated in the last first calculation processing is used. Therefore, the first calculation processing and second calculation processing will be described step by step.

Calculation of the Average Moving Speed Vmx

In the first calculation processing, the calculating unit 132 measures a coordinate Xnew of the fingertip FT from a plurality of capacitances measured by the input sensor circuit 125A at a plurality of consecutive points in time, and calculates the average moving speed Vmx of the fingertip FT according to the measured coordinate Xnew of the fingertip FT. The value of the average moving speed Vmx, calculated in the first calculation processing, of the fingertip FT is Vmx.

In the first calculation processing, the calculating unit 132 may update the average moving speed Vmx of the fingertip FT by taking the weighted average between the average moving speed Vmx calculated in the last first calculation processing and a value (Xnew−Xold)/T resulting from converting, to a speed, a value (Xnew−Xold) obtained by subtracting a coordinate Xold, calculated in the last second calculation processing, of the fingertip FT from the coordinate Xnew, measured in the current first calculation processing, of the fingertip FT.

Since the control period T during which the calculating unit 132 executes the first calculation processing and second calculation processing is fixed in each period, the result of the above calculation can be similarly obtained without converting (Xnew−Xold) to a speed. That is, in the first calculation processing, the calculating unit 132 may calculate the average moving speed Vmx of the fingertip FT by taking the weighted average between (Xnew−Xold) and the average moving speed Vmx calculated in the last first calculation processing.

Specifically, in the first calculation processing, the calculating unit 132 may calculate the average moving speed Vmx of the fingertip FT according to equation (1) below.

$$Vmx = (Vmx + a \times (Xnew - Xold))/(1 + a) \quad (1)$$

When a weighted average is taken to calculate the average moving speed Vmx of the fingertip FT, if the value of the weight "a" of (Xnew−Xold) for Vmx is appropriately set according to the characteristics and the like of the electrostatic coordinate input device 100, the average moving speed Vmx of the fingertip FT can be calculated with higher precision.

Measurement of the Coordinate Xnew

When the calculating unit 132 calculates the average moving speed Vmx of the fingertip FT in the first calculation processing, the calculating unit 132 measures the coordinate Xnew of the fingertip FT according to the distribution of capacitances measured by the input sensor circuit 125A. The coordinate Xnew is the X coordinate, measured by the calculating unit 132 in the current first calculation processing, of the fingertip FT from the distribution of capacitances measured by the input sensor circuit 125A. The capacitances measured by the input sensor circuit 125A are digital values of capacitances detected by a plurality of sensor electrodes 121.

As an example, the calculating unit 132 measures, as the coordinate Xnew, the average (center of gravity) of the X coordinates of a plurality of sensor electrodes 121 (four sensor electrodes 121, for example), from which a plurality of capacitances (four capacitances, for example) greater than or equal to a predetermined threshold have been obtained among a plurality of capacitances (nine capacitances, for example) measured by the input sensor circuit 125A.

Calculation of the Moving Speed Vx

The calculating unit 132 calculates the current moving speed Vx of the fingertip FT by subtracting the coordinate Xold, calculated in the last second calculation processing, of the fingertip FT from the coordinate Xnew and then dividing the subtraction result by the control period T to convert the subtraction result to a speed according to equation (2A) below.

$$Vx = (Xnew - Xold)/T \quad (2A)$$

The coordinate Xold is the coordinate X2, calculated in the last second calculation processing by the calculating unit 132, of the fingertip FT. To set Xold to the last coordinate X2 of the fingertip FT, Xold is updated before calculation in equation (2A) above is performed. That is, processing to set Xold to the coordinate X2 is performed.

Since the control period T, during which the calculating unit 132 executes the first calculation processing and second calculation processing, is a fixed period in each period, the moving speed Vx can be similarly calculated without (Xnew−Xold) having to be converted to a speed. That is, the calculating unit 132 may calculate the current moving speed Vx of the fingertip FT by subtracting the coordinate Xold of the fingertip FT, the coordinate Xold having been calculated in the last second calculation processing, from the coordinate Xnew according to equation (2B) below.

$$Vx = Xnew - Xold \quad (2B)$$

Calculation of the Predicted Coordinate X1

In the second calculation processing, the calculating unit 132 calculates the predicted coordinate X1 by adding a product Vmx×T, which is obtained by multiplying the average moving speed Vmx calculated in the first calculation processing by the control period T, to the coordinate Xold, calculated in the last second calculation processing, of the fingertip FT.

That is, the predicted coordinate X1 is represented as in equation (3A) below.

$$X1 = Vmx \times T + Xold \quad (3A)$$

As described above, the control period T, during which the calculating unit 132 executes the first calculation processing and second calculation processing, is a fixed period in each period. Therefore, the predicted coordinate X1 can be similarly calculated without Vmx having to be converted to a distance. That is, the calculating unit 132 may calculate the predicted coordinate X1 by adding the average moving speed Vmx calculated in the first calculation processing to the coordinate Xold of the fingertip FT, the coordinate Xold having been calculated in the last second calculation processing.

In this case, the predicted coordinate X1 is represented as in equation (3B) below.

$$X1 = Vmx + Xold \quad (3B)$$

The predicted coordinate X1 can be calculated as a predicted value for the current coordinate of the fingertip FT by adding a movement distance Vmx×T in one control period T at the average moving speed Vmx calculated in the first calculation processing to the coordinate Xold (equal to the coordinate X2), calculated in the last second calculation processing, of the fingertip FT.

When the coordinate Xold, calculated in the last second calculation processing, of the fingertip FT is used to calculate the predicted coordinate X1, the effect of noise on the obtained predicted coordinate X1 is reduced. When the average moving speed Vmx calculated in the first calculation processing is used to calculate the predicted coordinate X1, the effect of noise on the obtained predicted coordinate X1 is also reduced. Since a moving average is used to calculate the average moving speed Vmx, the predicted coordinate X1 has stability based on values obtained in at least three control periods T.

Calculation of the Coordinate X2

The calculating unit 132 calculates the average between the predicted coordinate X1 calculated in the second calculation processing and the measured coordinate Xnew of the fingertip FT as the coordinate X2 of the fingertip FT, according to equation (4) below.

$$X2 = (X1 + Xnew)/2 \quad (4)$$

As described above, the predicted coordinate X1 is calculated with high precision by reducing the effect of noise. The calculating unit 132 calculates the average between the predicted coordinate X1 calculated in the second calculation processing in this way and the coordinate Xnew of the fingertip FT as the coordinate X2 of the fingertip FT.

The effect of the average moving speed Vmx is reflected in the coordinate X2, finally calculated by the calculating unit 132, of the fingertip FT. Therefore, the coordinate X2, finally calculated by the calculating unit 132, of the fingertip FT has stability based on values obtained in at least three control periods T.

In the second calculation processing, the calculating unit 132 may calculate the weighted average between the predicted coordinate X1 and the coordinate Xnew, measured in the current first calculation processing, of the fingertip FT as the coordinate (X2) of the fingertip FT. When the weighted average between the predicted coordinate X1 and the coordinate Xnew is calculated as the coordinate (X2) of the fingertip FT, if weighting is appropriately performed according to the characteristics and the like of the electrostatic coordinate input device 100, the coordinate (X2) of the fingertip FT can be calculated with higher precision.

Calculation of X2

FIG. 3 illustrates an example of a process in which the electrostatic coordinate input device 100 calculates X2. In FIG. 3, the rightward direction is the +X direction.

In the second calculation processing, the calculating unit 132 calculates the predicted coordinate X1 by adding the product Vmx×T, obtained by multiplying the average moving speed Vmx by the control period T, to the coordinate Xold. In the current first calculation processing, the calculating unit 132 measures the coordinate Xnew of the fingertip FT.

In this case, it will be assumed that there is a deviation between the predicted coordinate X1 and the coordinate Xnew as illustrated in FIG. 3. This deviation occurs when the coordinate Xnew has been affected by noise or the like. The calculating unit 132 calculates the average between the predicted coordinate X1 and the coordinate Xnew as the coordinate X2 of the fingertip FT.

Therefore, the coordinate X2 of the fingertip FT is calculated as the median value between the predicted coordinate X1 and the coordinate Xnew.

When the coordinate X2 of the fingertip FT is obtained in this way, the calculating unit 132 can calculate the coordinate X2 of the fingertip FT with high precision with the effect of noise and like reduced.

As the predicted coordinate X1, a coordinate value is calculated that has less error due to noise but has been affected by error due to changes in the moving speed of the fingertip FT. In contrast, the coordinate Xnew, measured in the current first calculation processing, of the fingertip FT has been affected by error due to noise but has not been affected by changes in the moving speed of the fingertip FT. When an average is taken between the predicted coordinate X1 and coordinate Xnew of this type, it is possible to suppress both the effect of error due to noise and the effect of changes in the moving speed of the fingertip FT.

Flowcharts

Figure 4A:
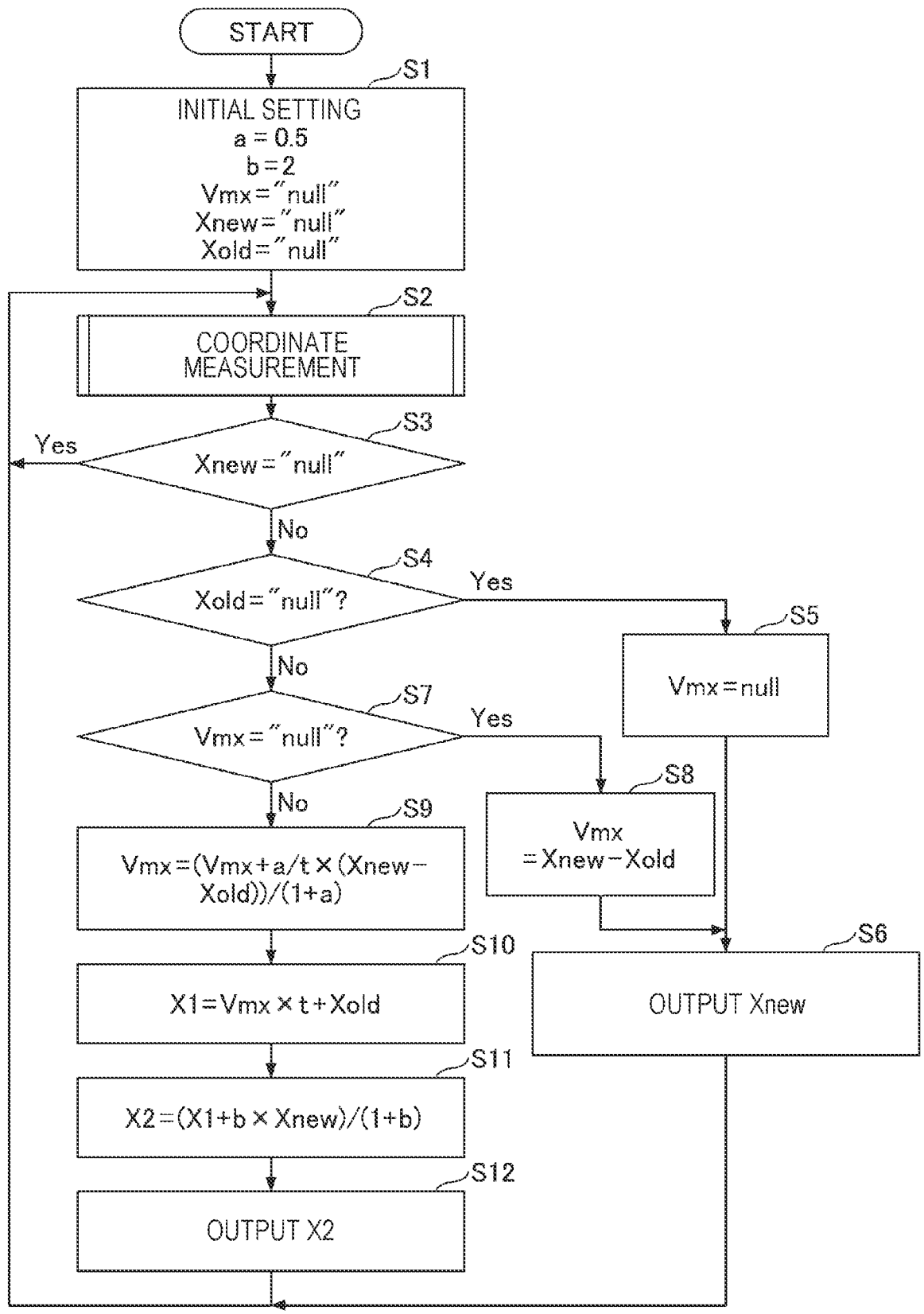
FIG. 4A is a flowchart illustrating an example of processing executed by a calculating unit in the electrostatic coordinate input device in the embodiment.
Figure 4B:
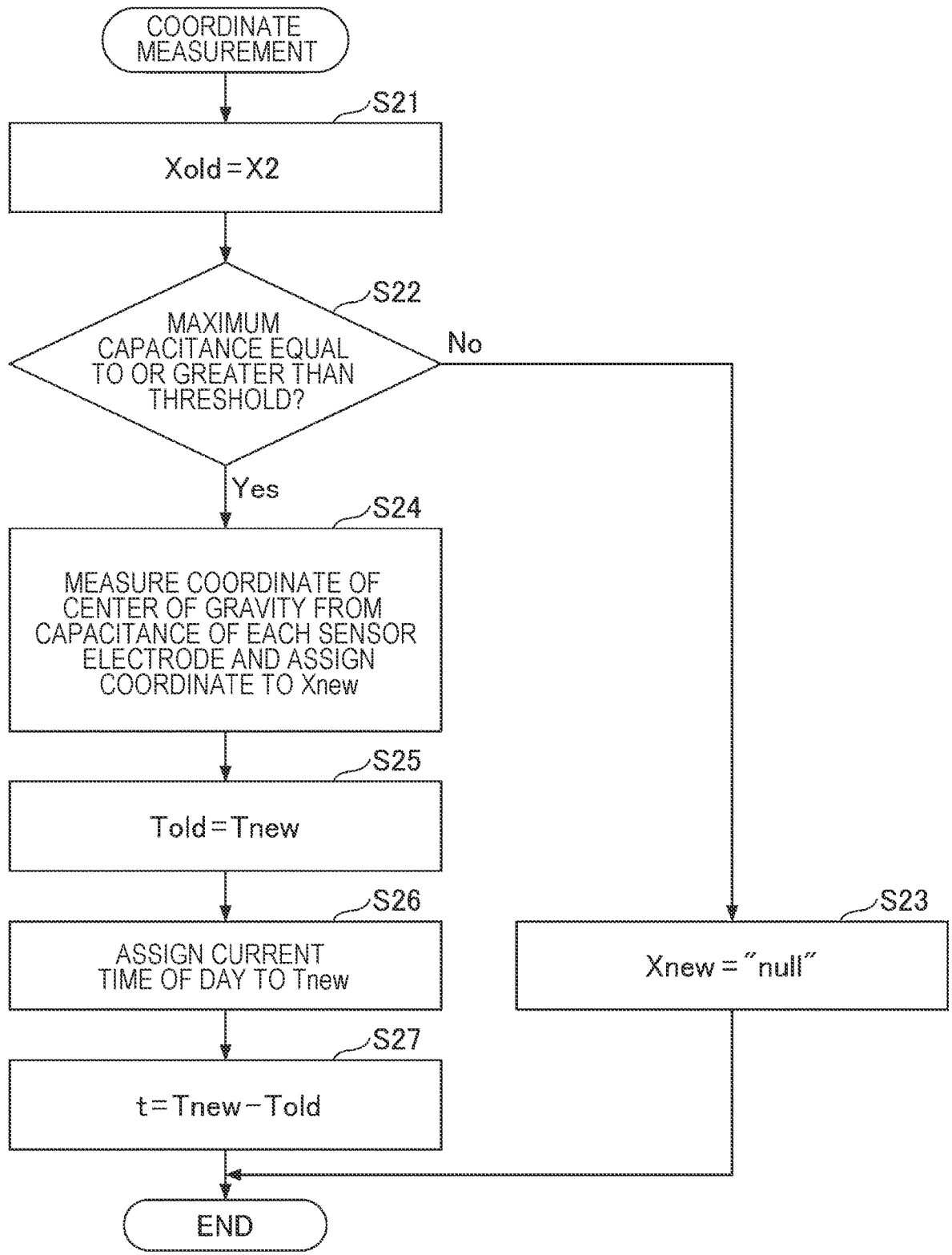
FIG. 4B is a flowchart illustrating an example of processing executed by the calculating unit in the electrostatic coordinate input device in the embodiment.

FIGS. 4A and 4B are each a flowchart illustrating an example of processing executed by the calculating unit 132. FIG. 4B illustrates subroutine processing in step S2 in FIG. 4A.

Processing in FIG. 4A

Processing in FIG. 4A is started when the electrostatic coordinate input device 100 is powered on, as an example.

The calculating unit 132 performs initial setting (step S1). In initial processing, a weight "a", a weight "b", the average moving speed Vmx, and the current coordinate Xnew and Xold of the fingertip FT are set. Xold is the coordinate X2, calculated in the last second calculation processing by the calculating unit 132, of the fingertip FT. Specifically, the calculating unit 132 sets "a" to 0.5, "b" to 2, Vmx to null, Xnew to null, and Xold to null, as an example. The term "null" means that no value is determined (a value is not present).

The calculating unit 132 performs coordinate measurement processing for the fingertip FT (step S2). In coordinate measurement processing, the calculating unit 132 measures the coordinate Xnew of the fingertip FT in the current first calculation processing according to the capacitance measured by the input sensor circuit 125A. Processing in step S2 is subroutine processing composed of the steps in FIG. 4B. In processing in FIG. 4B, time t is measured from when the last first calculation processing was executed to when the current first calculation processing is executed. Processing in FIG. 4B will be described later.

The calculating unit 132 decides whether Xnew is null (step S3).

If the calculating unit 132 decides that Xnew is null (Yes in S3), the calculating unit 132 returns the flow to step S2.

If the calculating unit 132 decides in step S3 that Xnew is not null (No in S3), the calculating unit 132 decides whether Xold is null (step S4).

If the calculating unit 132 decides that Xold is null (Yes in S4), the calculating unit 132 sets Vmx to null (step S5). This is because only when the last position (Xold) is present, the average moving speed Vmx can be measured.

The calculating unit 132 outputs Xnew as the current coordinate of the fingertip FT (step S6). Upon the completion of processing in step S6, the calculating unit 132 returns the flow to step S2.

If the calculating unit 132 decides in step S4 that Xold is not null (No in S4), the calculating unit 132 decides whether the average moving speed Vmx is null (step S7).

If the calculating unit 132 decides that the average moving speed Vmx is null (Yes in S7), the calculating unit 132 sets Vmx to Xnew-Xold (step S8). Upon the completion of processing in step S8, the calculating unit 132 causes the flow to proceed to step S6.

If the calculating unit 132 decides in step S7 that the average moving speed Vmx is not null (No in S7), the calculating unit 132 calculates the average moving speed Vmx (step S9). Only in a third period or later, a negative result is obtained in step S7.

The calculating unit 132 calculates the average moving speed Vmx according to equation (5) below. In equation (5), t is time t measured in step S2, time t being from when the last first calculation processing was executed to when the current first calculation processing is executed. The equal sign (=) indicates that the calculation result on the right side is assigned to the left side. Vmx on the right side is the last calculation result, and Vmx on the left side is the current calculation result.

$$Vmx = (Vmx + a/t \times (Xnew - Xold))/(1 + a) \quad (5)$$

The calculating unit 132 calculates the predicted coordinate X1 according to equation (6) below (step S10).

$$X1 = Vmx \times t + Xold \quad (6)$$

The calculating unit 132 calculates the coordinate X2 of the fingertip FT according to equation (7) below (step S11). Here, a weighted average in which Xnew is multiplied by the weight "b" is used to calculate the coordinate X2, as an example.

$$X2 = (X1 + b \times Xnew)/(1 + b) \quad (7)$$

The calculating unit 132 outputs the coordinate X2 of the fingertip FT (step S12).

This completes a series of processing in FIG. 4A. Processing in FIG. 4A is repeated until power is turned off.

Processing in FIG. 4B

The calculating unit 132 sets Xold to X2, which is the X coordinate of the fingertip FT in the last calculation (step S21). That is, the calculating unit 132 performs processing for Xold=X2.

The calculating unit 132 decides whether the maximum capacitance of the capacitances measured by the input sensor circuit 125A is equal to or greater than a predetermined threshold (step S22).

If the calculating unit 132 decides that the maximum capacitance is not equal to or greater than the predetermined threshold (No in S22), the calculating unit 132 sets Xnew to null (step S23). That is, Xnew=null holds. When the maximum capacitance is not equal to or greater than the predetermined threshold, it is regarded that a finger is not present in the vicinity of the top panel 105.

If the calculating unit 132 decides in step S22 that the maximum capacitance is equal to or greater than the predetermined threshold (Yes in S22), the calculating unit 132 measures the X coordinate of the center of gravity from the capacitances, measured by the input sensor circuit 125A, of a plurality of sensor electrodes 121 and assigns the X coordinate to Xnew (step S24).

The calculating unit 132 sets Told to Tnew in the last period (step S25). That is, the calculating unit 132 performs processing for Told=Tnew. Tnew is a value set in the last period, that is, a value before an update in the current period.

The calculating unit 132 assigns the current time of the day to Tnew (step S26). Tnew is a time of the day at the time of executing the current first calculation processing. In processing in step S26, Tnew is updated.

With the electrostatic coordinate input device 100, the current time of the day at the time of executing step S26 is handled as the time of the day at which the first calculation processing is executed. Tnew only needs to be a time of the day at a determined point in time during the execution of the first calculation processing and second calculation processing. Tnew is not limited to the current time of the day at the time when step S26 is executed. Tnew may be, for example, a time of the day at which to start the first calculation processing.

The calculating unit 132 calculates time t (step S27). That is, time t=Tnew-Told holds.

Due to processing as described above with reference to FIG. 4B, the coordinate Xnew of the fingertip FT and time t are obtained.

Variation

FIG. 5 illustrates an example of the structures of a capacitive sensor, a control device, and the like included in an electrostatic coordinate input device 100M in a variation of the embodiment.

The electrostatic coordinate input device 100M in the variation of the embodiment has a structure in which the capacitive sensor 120 in the electrostatic coordinate input device 100 illustrated in FIG. 2 is replaced with a capacitive sensor 120M. The capacitive sensor 120M can acquire XY coordinates. With the electrostatic coordinate input device 100M, the calculating unit 132 calculates the coordinates X2 and Y2 of the fingertip FT. The difference between the electrostatic coordinate input device 100M and the electrostatic coordinate input device 100 illustrated in FIG. 2 will be described below with reference to FIG. 5.

The capacitive sensor 120M has a plurality of sensor electrodes 121X extending in the X direction and a plurality of sensor electrodes 121Y extending in the Y direction. The wiring board 125, on which the input sensor circuit 125A and image display circuit 125B are mounted, is placed next to the capacitive sensor 120M and display 110. The input sensor circuit 125A is connected between wires 122X and the control device 130 and between wires 122Y and the control device 130. The image display circuit 125B is connected between the display 110 and the control device 130. When the capacitive sensor 120M of this type is used, a plurality of GUI buttons arranged along the X direction and Y direction, for example, can be used as the manipulation portion of electrostatic coordinate input device 100M. This because the capacitive sensor 120M can acquire X coordinates and Y coordinates.

The sensor electrodes 121X are connected to the control device 130 through the wires 122X and input sensor circuit 125A. Similarly, the sensor electrodes 121Y are connected to the control device 130 through the wires 122Y and input sensor circuit 125A. The capacitive sensor 120M of this type can be manufactured by, as an example, forming a transparent conductive film such as an ITO transparent conductive film on a surface of a transparent glass and then performing pattering on the transparent conductive film to form the sensor electrodes 121X and 121Y and wires 122X and 122Y. The value of a capacitance detected by the capacitive sensor 120M is entered into the control device 130.

FIG. 5 illustrates a plurality of sensor electrodes 121X and a plurality of sensor electrodes 121Y as an example. A spacing between adjacent sensor electrodes 121X and a spacing between adjacent sensor electrodes 121Y are smaller than a typical width of the fingertip FT.

The wiring board 125, included in the capacitive sensor 120M, is of a flexible type or a rigid type. As described above, the input sensor circuit 125A is disposed between the wires 122X and the control device 130 and between the wires 122Y and the control device 130. The input sensor circuit 125A sequentially selects a plurality of wires 122X and a plurality of wires 122Y one at a time, obtains a capacitance of the capacitive sensor 120M, converts the obtained capacitance from analog to digital, and outputs the conversion result to the control device 130. The image display circuit 125B is disposed between the display 110 and the control device 130. The image display circuit 125B displays an image on the display 110 according to image data sent from the control device 130.

Calculation of the Differential Value ΔAD by the Calculating Unit 132

The calculating unit 132 scans a plurality of sensor electrodes 121X one row at a time and also scans a plurality of sensor electrodes 121Y one column at a time. The calculating unit 132 converts capacitances at a plurality of intersections between the plurality of sensor electrodes 121X and the plurality of sensor electrodes 121Y to digital values. The calculating unit 132 represents the amount of change in the digital value output converted from the capacitance as a count value to calculate the differential ΔAD at each intersection. The differential ΔAD is a count value representing the amount of change of an output from the input sensor circuit 125A with respect to a reference value. The reference value is the capacitance at each intersection between the sensor electrode 121X and the sensor electrode 121Y when a target such as the fingertip FT is not present in the vicinity of the sensor electrodes 121X and 121Y.

The calculating unit 132 performs calculation processing to calculate the XY coordinates of the fingertip FT according to a capacitance (digital value) entered from the input sensor circuit 125A. The calculating unit 132 converts the capacitance (digital value) received from the input sensor circuit 125A to the differential ΔAD, and calculates the position of the fingertip FT according to the differential ΔAD. The calculating unit 132 calculates the X coordinate and Y coordinate of the fingertip FT in this way.

As an example, the calculating unit 132 measures, as the coordinates Xnew and Ynew, the center of gravity of the X coordinates and Y coordinates of a plurality of intersections at which capacitances of a predetermined threshold or more were obtained, the capacitances being part of the capacitances measured by the input sensor circuit 125A at a plurality of intersections of sensor electrodes 121X and sensor electrodes 121Y, to measure the final coordinates X2 and Y2 of the fingertip FT.

Flowchart in the Variation

Figure 6A:
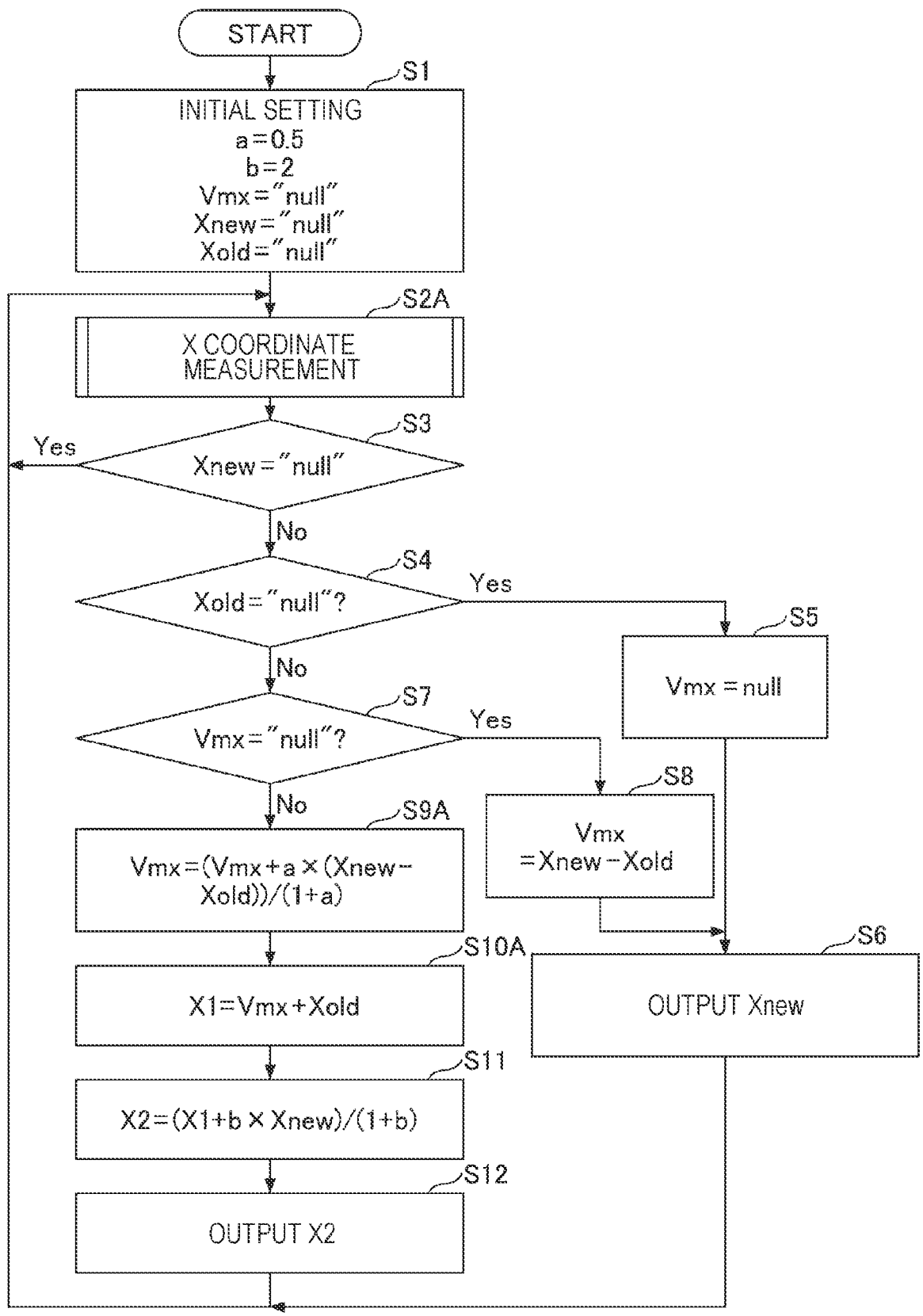
FIG. 6A is a flowchart illustrating an example of processing executed by a calculating unit in the electrostatic coordinate input device in the variation of the embodiment.
Figure 7A:
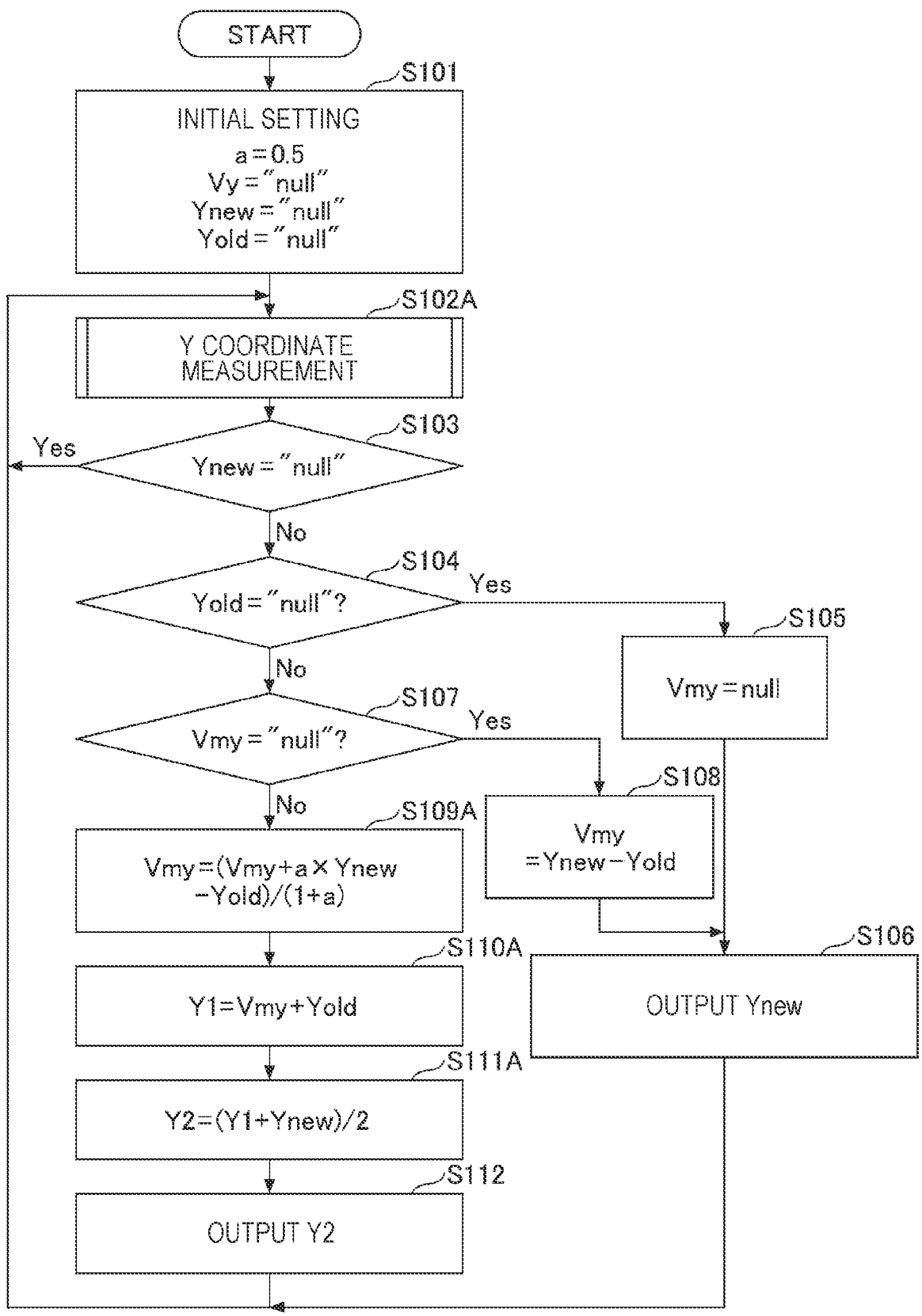
FIG. 7A is a flowchart illustrating an example of processing executed by a calculating unit in the electrostatic coordinate input device in the variation of the embodiment.
Figure 7B:
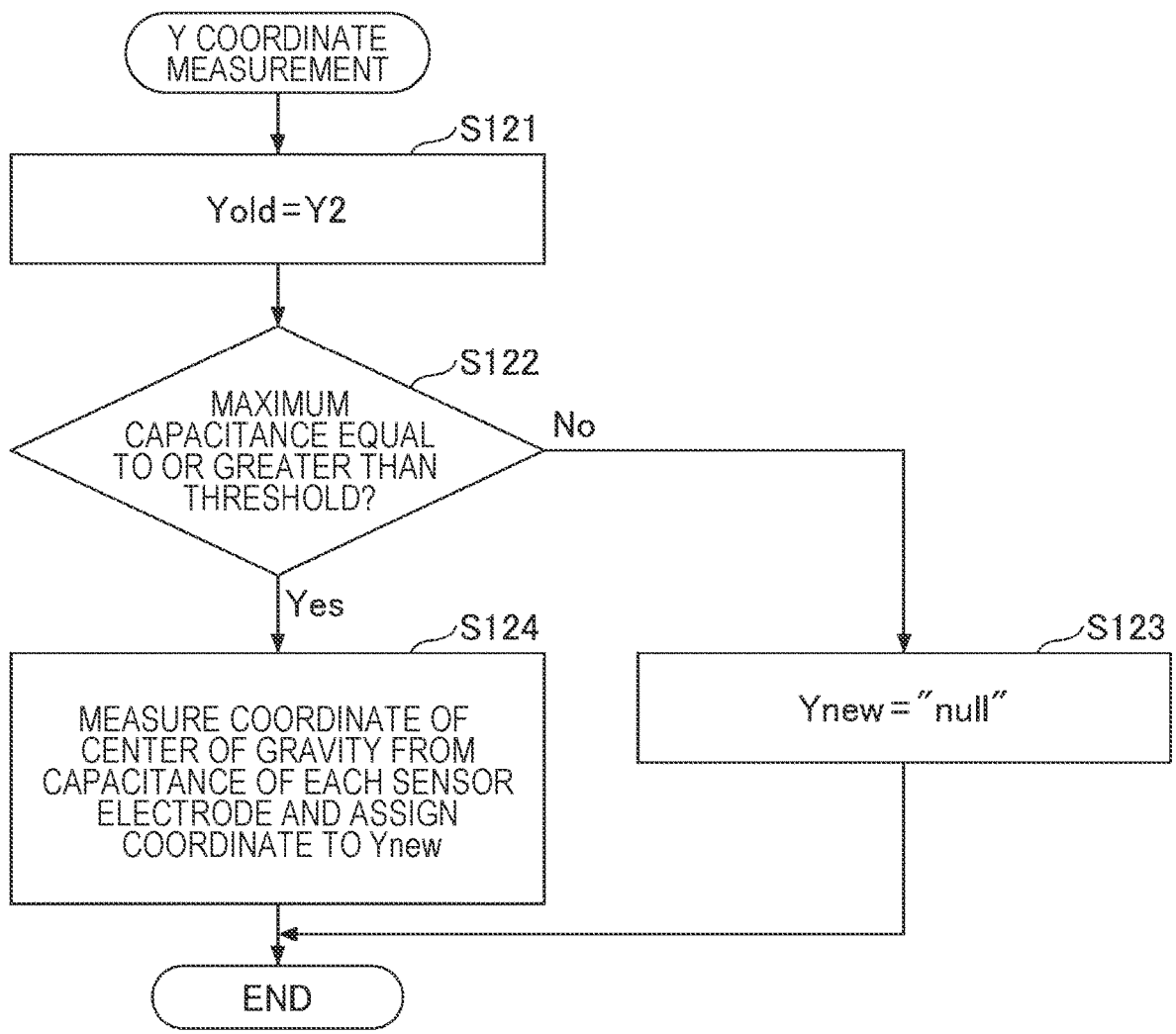
FIG. 7B is a flowchart illustrating an example of processing executed by the calculating unit in the electrostatic coordinate input device in the variation of the embodiment.

FIGS. 6A, 6B, 7A, and 7B are each a flowchart illustrating an example of processing executed by the calculating unit 132 in the electrostatic coordinate input device 100M in the variation of the embodiment. Processing in FIGS. 6A and 6B is concerned with X coordinates. Processing in FIGS. 7A and 7B is concerned with Y coordinates.

First, processing in FIG. 6A will be described. The flowchart in FIG. 6B illustrates subroutine processing in step S2A in FIG. 6A. In processing in FIGS. 6A and 6B, processing identical to processing in FIGS. 4A and 4B is assigned identical step numbers, and repeated descriptions will be omitted.

In processing in FIGS. 6A and 6B, the control period T, during which the calculating unit 132 executes the first calculation processing and second calculation processing, is a fixed period in each period, so Vmx does not need to be converted to a distance. Similarly, Xnew-Xold does not need to be converted to a speed.

Processing in FIG. 6A

Processing in FIG. 6A is started when the electrostatic coordinate input device 100M is powered on, as an example. Processing in FIG. 6A is concerned with X coordinates.

The calculating unit 132 performs initial setting (step S1). Step S1 is the same as step S1 in FIG. 4A.

The calculating unit 132 performs X coordinate measurement processing for the fingertip FT (step S2A). In X coordinate measurement processing, the calculating unit 132 measures the coordinate Xnew of the fingertip FT in the current first calculation processing. Processing in step S2A is subroutine processing composed of the steps in FIG. 6B. Processing in FIG. 6B differs from processing in FIG. 4B in that time t is not measured. Processing in FIG. 6B will be described later.

Steps S3 to S8 are the same as steps S3 to S8 in FIG. 4A, so repeated descriptions will be omitted.

If the calculating unit 132 decides in step S7 that the average moving speed Vmx is not null (No in S7), the calculating unit 132 calculates the average moving speed Vmx (step S9A).

The calculating unit 132 calculates the average moving speed Vmx according to equation (8) below.

$$Vmx = (Vmx + a \times (Xnew - Xold))/(1 + a) \qquad (8)$$

The calculating unit 132 calculates the predicted coordinate X1 according to equation (9) below (step S10A).

$$X1 = Vmx + Vold \qquad (9)$$

Upon the completion of processing in step S10A, the calculating unit 132 executes processing in steps S11 and S12. Processing in steps S11 and S12 are the same as processing in steps S11 and S12 in FIG. 4A, so repeated descriptions will be omitted.

This completes a series of processing in FIG. 6A. Processing in FIG. 6A is repeated until power is turned off.

Processing in FIG. 6B

Processing in FIG. 6B is the same as processing in FIG. 4B except that steps S25 to S27 in FIG. 4B are omitted. This is because the control period T during which the calculating unit 132 executes the first calculation processing and second calculation processing is fixed in each period, so time t is not measured.

In processing in FIG. 6B, the coordinate Xnew of the fingertip FT is obtained.

Processing in FIGS. 7A and 7B is similar to processing in FIGS. 6A and 6B, which is concerned with X coordinates, but is performed for Y coordinates. Therefore, processing in FIGS. 7A and 7B will be similarly described below by replacing the letter X for X coordinates and the speed in the X direction in FIGS. 6A and 6B with the letter Y. Repeated descriptions will be omitted to simplify descriptions.

Processing in FIG. 7A

Processing in FIG. 7A is started when the electrostatic coordinate input device 100M executes processing in FIG. 6A, and is executed in parallel.

The calculating unit 132 performs initial setting (step S101). Step S101 is similar to step S1 in FIG. 6A. In processing in step S101, the current coordinates Ynew of the fingertip FT and its coordinate Yold are set. Yold is the coordinate Y2, calculated in the last second calculation processing by the calculating unit 132, of the fingertip FT. The weight "a" may take a value different from the value of the weight "a" in step S101. In processing in FIG. 7A, the weight "b" is not set. In other words, in averaging processing in step S111A in FIG. 7A, the weight "b" in step S11 in FIG. 6A is set to 1.

The calculating unit 132 performs Y coordinate measurement processing for the fingertip FT (step S102A). In Y coordinate measurement processing, the calculating unit 132 measures Ynew, which is the Y coordinate of the fingertip FT, in the current first calculation processing. Processing in step S102A is subroutine processing composed of the steps in FIG. 7B. In processing in FIG. 7B, time t is not measured as in processing in FIG. 6B. Processing in FIG. 7B will be described later.

In steps S103 to S108, processing is performed for Y coordinates similarly as in processing for X coordinates in steps S3 to S8 in FIG. 6A. Therefore, descriptions for steps S103 to S108 will be omitted. The average moving speed in the Y direction will be denoted Vmy.

If the calculating unit 132 decides in step S107 that the average moving speed Vmy is not null (No in S107), the calculating unit 132 calculates the average moving speed Vmy according to an equation described below (step S109A).

The calculating unit 132 calculates the average moving speed Vmy according to equation (10) below. The equal sign (=) indicates that the calculation result on the right side is assigned to the left side. Vmy on the right side is the last calculation result, and Vmy on the left side is the current calculation result.

$$Vmy = (Vmy + a \times (Ynew - Yold))/(1+a) \quad (10)$$

The calculating unit 132 calculates the predicted coordinate Y1 according to equation (11) below (step S110A).

$$Y1 = Vmy + Yold \quad (11)$$

Upon the completion of processing in step S110A, the calculating unit 132 executes processing for Y coordinates in steps S111A and S112. In steps S111A and S112, processing is performed for Y coordinates similarly as in processing for X coordinates in steps S11 and S12 in FIG. 6A. Therefore, descriptions for steps S111A and S112 will be omitted. In step S112, however, the calculating unit 132 outputs the coordinate Y2 of the fingertip FT (step S112).

This completes a series of processing in FIG. 7A. Processing in FIG. 7A is repeated until power is turned off. In step S111A, a weighted average may be used to calculate the coordinate Y2, as in step S11 in FIG. 6A.

Processing in FIG. 7B

In steps S121 and S124 in FIG. 7B, processing is performed for Y coordinates similarly as in processing for X coordinates in steps S21 to S24 in FIG. 6B.

In step S121, the calculating unit 132 sets Yold to Y2, which is the last calculated Y coordinate of the fingertip FT (step S121). In step S124, the calculating unit 132 measures the Y coordinate of the center of gravity from the capacitances, measured by the input sensor circuit 125A, of a plurality of sensor electrodes 121Y, and assigns the Y coordinate to Ynew (step S124).

In processing in FIG. 7B, the coordinate Ynew of the fingertip FT is obtained.

Effects

The electrostatic coordinate input device 100 includes: a plurality of sensor electrodes 121 disposed on the rear surface side of the manipulation surface 105A; the input sensor circuit 125A (measuring circuit) that measures a capacitance between each of the plurality of sensor electrodes 121 and an indicating body (fingertip FT), with which a manipulation input is performed on the manipulation surface 105A; and the calculating unit 132 that calculates the coordinate of the fingertip FT according to a plurality of capacitances measured by the input sensor circuit 125A. The calculating unit 132 repeatedly executes the first calculation processing, in which the calculating unit 132 measures the coordinate Xnew of the fingertip FT from the plurality of capacitances and then calculates the average moving speed Vmx of the fingertip FT according to the measured coordinate Xnew of the fingertip FT, as well as the second calculation processing. In the second calculation processing, the calculating unit 132 calculates the average X2 between the predicted coordinate X1 and the measured coordinate Xnew of the fingertip FT as the coordinate of the fingertip FT, the predicted coordinate X1 being obtained by adding the product Vmx×T, which is obtained by multiplying the average moving speed Vmx by time t from the last first calculation processing to the current first calculation processing, to the coordinate Xold, calculated in the last second calculation processing, of the fingertip FT.

Noise-caused error in the average moving speed Vmx used in the calculation of a predicted value is small due to averaging. Noise-caused error in the coordinate Xold, calculated last, of the fingertip FT is also small due to averaging because the coordinate Xold is calculated by using the average moving speed Vmx. Therefore, noise-caused error in the predicted coordinate X1 is small. However, a coordinate value affected by error due to a change in the moving speed of the fingertip FT is calculated as the predicted coordinate X1. In contrast, the coordinate Xnew, measured in the current first calculation processing, of the fingertip FT is also affected by noise-caused error, but is free from error due to a change in the moving speed of the fingertip FT. When the average between the predicted coordinate X1 and coordinate Xnew of this type is taken, it is possible to suppress both the effect of noise-caused error and the effect of error due to a change in the moving speed of a finger.

Therefore, it is possible to provide the electrostatic coordinate input device 100 that calculates the coordinate of an indicating body with high precision.

The calculating unit 132 can also perform similar processing for the Y direction. In the first calculation processing, the calculating unit 132 may calculate the average moving speed Vmy in the Y direction at the coordinate of the fingertip FT. Then, in the second calculation processing, the calculating unit 132 may calculate, as the Y coordinate of the fingertip FT, the average Y2 between the predicted coordinate Y1 and the coordinate Ynew, measured in the first calculation processing, of the fingertip FT. The calculating unit 132 may perform the first calculation processing and second calculation processing only in one direction (that is, only in the X direction or only in the Y direction). The calculating unit 132 may perform first calculation processing and second calculation processing at the same time in the X direction and Y direction. In this case, the calculating unit 132 only needs to perform first calculation processing and second calculation processing for the X direction and Y direction at the same in parallel.

The calculating unit 132 may hold time t to fixed time and may repeatedly execute the first calculation processing. When the calculating unit 132 calculates the average moving speed Vmx of the fingertip FT in the first calculation processing, the calculating unit 132 may calculate the current moving speed of the fingertip FT by subtracting the coordinate Xold, calculated in the last second calculation processing, of the fingertip FT from the coordinate Xnew of the fingertip FT in the current measurement. Since the item concerned with time can be eliminated from the calculation equation, the amount of calculation can be reduced. Therefore, it is possible to provide the electrostatic coordinate input device 100 that calculates the coordinate of an indicating body with higher precision.

The calculating unit 132 can also perform similar processing for the Y direction. The calculating unit 132 may calculate the current moving speed of the fingertip FT in the Y direction.

In the first calculation processing, the calculating unit 132 may calculate the average moving speed Vmx of the fingertip FT by taking the weighted average between the average moving speed Vmx calculated in the last first calculation processing and a value resulting from converting, to a speed, a value obtained by subtracting the coordinate Xold, calculated in the last second calculation processing, of the fingertip FT from the coordinate Xnew of the fingertip FT in the current measurement. When a weighted average is taken, it is possible to provide the electrostatic coordinate input device 100 that calculates the coordinate of an indicating body with higher precision.

The calculating unit 132 can also perform similar processing for the Y direction. The calculating unit 132 may calculate the average moving speed Vmy of the fingertip FT in the Y direction.

In the first calculation processing, the calculating unit 132 may calculate the average moving speed Vmx of the fingertip FT according to equation (5A) below $$Vmx = (Vmx + a \times (Xnew - Xold))/(1 + a) \qquad (5A)$$

where Vmx on the right side is the average moving speed, calculated in the last first calculation processing, of the fingertip FT, Xnew is the coordinate, measured in the current first calculation processing, of the fingertip FT, Xold is the coordinate, calculated in the last second calculation processing, of the fingertip FT, and "a" is a weight.

Since the average moving speed Vmx can be easily calculated according to equation (5A) in consideration of the weight of the average moving speed Vmx and a value resulting from converting, to a speed, a value obtained by subtracting the coordinate Xold from the coordinate Xnew, it is possible to provide the electrostatic coordinate input device 100 that easily calculates the coordinate of an indicating body with higher precision.

For Y coordinates as well, the calculating unit 132 may similarly calculate the average moving speed Ymy of the fingertip FT. In the first calculation processing, the calculating unit 132 may calculate the average moving speed Vmx of the fingertip FT according to equation (5B) below $$Vmy = (Vmy + a \times (Ynew - Yold))/(1 + a) \qquad (5B)$$

where Vmy on the right side is the average moving speed in the Y direction, calculated in the last first calculation processing, of the fingertip FT, Ynew is the Y coordinate, measured in the current first calculation processing, of the fingertip FT, Yold is the Y coordinate, calculated in the last second calculation processing, of the fingertip FT, and "a" is a weight. The value of the weight "a" may be different between equation (5A) and equation (5B).

The calculating unit 132 may calculate the coordinate X2 of the fingertip FT from the weighted average between the predicted coordinate X1 and the coordinate Xnew of the fingertip FT.

When the weighted average between the predicted coordinate X1 and the coordinate Xnew is regarded as the coordinate (X2) of the fingertip FT, it is possible to provide the electrostatic coordinate input device 100 that calculates the coordinate of an indicating body with higher precision.

The calculating unit 132 can also perform similar processing for the Y direction. The calculating unit 132 may calculate the Y coordinate (Y2) of the fingertip FT.

The plurality of sensor electrodes 121 may be arranged in one direction. To manipulate the slide switch 110B, the fingertip FT is slid on the slide switch 110B in one direction, in which case a speed at which the fingertip FT is moved does not usually change rapidly. Therefore, the present disclosure enables the coordinate of the fingertip FT to be calculated with high precision.

Therefore, it is possible to provide the electrostatic coordinate input device 100 that calculates the coordinate of an indicating body with higher precision regardless of whether the display 110 is present.

This completes the description of the electrostatic coordinate input device in an exemplary embodiment of the present disclosure. However, the present disclosure is not limited to specifically disclosed embodiments, but can be varied and modified in various other ways without departing from the scope of the claims.

The following notes will be additionally disclosed in relation to the above embodiment.

Note 1

An electrostatic coordinate input device including:
a plurality of sensor electrodes disposed on the rear surface side of a manipulation surface;
a measuring circuit that measures a capacitance between each of the plurality of sensor electrodes and an indicating body, with which a manipulation input is performed on the manipulation surface; and
a calculating unit that calculates the coordinate of the indicating body according to a plurality of capacitances measured by the measuring circuit; wherein
the calculating unit repeatedly executes
first calculation processing, in which the calculating unit measures the coordinate of the indicating body from the plurality of capacitances and then calculates the average moving speed of the indicating body according to the measured coordinate of the indicating body, and
second calculation processing,
in the second calculation processing, the calculating unit calculates the average between a predicted coordinate and the measured coordinate of the indicating body as the coordinate of the indicating body, the predicted coordinate being obtained by adding a product, which is obtained by multiplying the average moving speed by time from the last first calculation processing to the current first calculation processing, to the coordinate, calculated in the last second calculation processing, of the indicating body.

Note 2

The electrostatic coordinate input device of note 1, wherein:
the calculating unit holds the time to fixed time and repeatedly executes the first calculation processing; and
when the calculating unit calculates the average moving speed of the indicating body in the first calculation processing, the calculating unit calculates the current moving speed of the indicating body by subtracting the coordinate, calculated in the last second calculation processing, of the indicating body from the coordinate of the indicating body in the current measurement.

Note 3

The electrostatic coordinate input device of note 1 or 2, wherein in the first calculation processing, the calculating unit calculates the average moving speed of the indicating body by taking the weighted average between the average moving speed calculated in the last first calculation processing and a value resulting from converting, to a speed, a value obtained by subtracting the coordinate, calculated in the last second calculation processing, of the indicating body from the coordinate of the indicating body in the current measurement.

Note 4

The electrostatic coordinate input device of note 3, wherein in the first calculation processing, the calculating unit calculates the average moving speed Vmx of the indicating body according to equation (1) below.

$$Vmx = (Vmx + a \times (Xnew - Xold))/(1 + a) \quad (1)$$

where Vmx on the right side is the average moving speed, calculated in the last first calculation processing, of the indicating body, Xnew is the coordinate of the indicating body in the current measurement, Xold is the coordinate, calculated in the last second calculation processing, of the indicating body, and "a" is a constant.

Note 5

The electrostatic coordinate input device of any one of notes 1 to 4, wherein in the second calculation processing, the calculating unit calculates, as the coordinate of the indicating body, the weighted average between the predicted coordinate and the coordinate, measured in the current first calculation processing, of the indicating body.

Note 6

The electrostatic coordinate input device of any one of notes 1 to 6, wherein the plurality of sensor electrodes are arranged in one direction.

What is claimed is:

1. An electrostatic coordinate input device comprising:
a plurality of sensor electrodes disposed on a rear surface side of a manipulation surface;
a measuring circuit that measures a capacitance between each of the plurality of sensor electrodes and an indicating body, with which a manipulation input is performed on the manipulation surface; and
a calculating unit that calculates a coordinate of the indicating body according to a plurality of capacitances measured by the measuring circuit; wherein
the calculating unit repeatedly executes
first calculation processing, in which the calculating unit measures the coordinate of the indicating body from the plurality of capacitances and then calculates an average moving speed of the indicating body according to the measured coordinate of the indicating body, and
second calculation processing,
in the second calculation processing, the calculating unit calculates an average between a predicted coordinate and the measured coordinate of the indicating body as the coordinate of the indicating body, the predicted coordinate being obtained by adding a product, which is obtained by multiplying the average moving speed by time from last first calculation processing to current first calculation processing, to a coordinate, calculated in last second calculation processing, of the indicating body.

2. The electrostatic coordinate input device according to claim 1, wherein:
the calculating unit holds the time to fixed time and repeatedly executes the first calculation processing; and
when the calculating unit calculates the average moving speed of the indicating body in the first calculation processing, the calculating unit calculates a current moving speed of the indicating body by subtracting the coordinate, calculated in the last second calculation processing, of the indicating body from the coordinate of the indicating body in current measurement.

3. The electrostatic coordinate input device according to claim 1, wherein in the first calculation processing, the calculating unit calculates the average moving speed of the indicating body by taking a weighted average between the average moving speed calculated in the last first calculation processing and a value resulting from converting, to a speed, a value obtained by subtracting the coordinate, calculated in the last second calculation processing, of the indicating body from the coordinate of the indicating body in the current measurement.

4. The electrostatic coordinate input device according to claim 3, wherein in the first calculation processing, the calculating unit calculates the average moving speed Vmx of the indicating body according to equation (1) below $$Vmx = (Vmx + a \times (Xnew - Xold))/(1 + a) \qquad (1)$$

where Vmx on the right side is the average moving speed, calculated in the last first calculation processing, of the indicating body, Xnew is the coordinate of the indicating body in the current measurement, Xold is the coordinate, calculated in the last second calculation processing, of the indicating body, and "a" is a constant.

5. The electrostatic coordinate input device according to claim 1, wherein in the second calculation processing, the calculating unit calculates, as the coordinate of the indicating body, a weighted average between the predicted coordinate and the coordinate, measured in the current first calculation processing, of the indicating body.

6. The electrostatic coordinate input device according to claim 1, wherein the plurality of sensor electrodes are arranged in one direction.

* * * * *